United States Patent
Chevallereau et al.

(10) Patent No.: US 11,192,251 B2
(45) Date of Patent: Dec. 7, 2021

(54) METHOD AND DEVICE FOR CONTROLLING A ROBOT DURING CO-ACTIVITY

(71) Applicants: INSTITUT DE RECHERCHE TECHNOLOGIQUE JULES VERNE, Bouguenais (FR); CENTRE NATIONAL DE LA RECHERCHE SCIENTIFIQUE, Paris (FR); UNIVERSITE DE NANTES, Nantes (FR)

(72) Inventors: Christine Chevallereau, Sainte-Luce-sur-Loire (FR); Alexis Girin, Treillières (FR); Philip Long, Bouguenais (FR)

(73) Assignees: INSTITUT DE RECHERCHE TECHNOLOGIQUE JULES VERNE, Bouguenais (FR); CENTRE NATIONAL DE LA RECHERCHE SCIENTIFIQUE, Paris (FR); UNIVERSITE DE NANTES, Nantes (FR)

( * ) Notice: Subject to any disclaimer, the term of this patent is extended or adjusted under 35 U.S.C. 154(b) by 598 days.

(21) Appl. No.: 15/779,516

(22) PCT Filed: Nov. 28, 2016

(86) PCT No.: PCT/EP2016/079055
§ 371 (c)(1),
(2) Date: Sep. 27, 2018

(87) PCT Pub. No.: WO2017/089623
PCT Pub. Date: Jun. 1, 2017

(65) Prior Publication Data
US 2019/0030716 A1    Jan. 31, 2019

(30) Foreign Application Priority Data

Nov. 26, 2015  (FR) ...................... 15 02473

(51) Int. Cl.
*B25J 9/16*    (2006.01)

(52) U.S. Cl.
CPC .......... *B25J 9/1676* (2013.01); *B25J 9/1651* (2013.01); *B25J 9/1674* (2013.01); *B25J 9/1697* (2013.01); *G05B 2219/49201* (2013.01)

(58) Field of Classification Search
CPC ...... B25J 9/1676; B25J 9/1651; B25J 9/1674; B25J 9/1697; B25J 9/1664; G05B 2219/49201

See application file for complete search history.

(56) References Cited

U.S. PATENT DOCUMENTS

| 5,006,988 | A * | 4/1991 | Borenstein | ........... G05D 1/0255 180/169 |
| 9,102,062 | B2 * | 8/2015 | Lee | ........ B25J 9/1666 |

(Continued)

*Primary Examiner* — Khoi H Tran
*Assistant Examiner* — Nhi Q Bui
(74) *Attorney, Agent, or Firm* — Im IP Law; Chai Im; C. Andrew Im

(57) ABSTRACT

A method for controlling the operation of a robot within a system. The system includes the robot and sensors to analyze the concentric environment of the system. The sensors include a contact sensor, a proximity sensor and a vision and location sensor. For each of the axes of the robot, a maximum allowable force value is obtained. If the force on one of the axes of the robot is greater than the maximum value, the robot is stopped in its position. A concentric monitoring space or a security space is obtained as a function of the speed of the robot. The environment of the robot is monitored by the sensors. If the intrusion of an object is detected in the safe space of the robot, the maneuvering speed of the (Continued)

robot is gradually decreased to a safe speed. The process is repeated for the next axis of the robot.

9 Claims, 3 Drawing Sheets

(56) References Cited

U.S. PATENT DOCUMENTS

| | | | | |
|---|---|---|---|---|
| 2011/0270443 | A1* | 11/2011 | Kamiya | G05B 19/401 |
| | | | | 700/245 |
| 2013/0184980 | A1* | 7/2013 | Ichikawa | B25J 9/1676 |
| | | | | 701/301 |
| 2014/0067121 | A1* | 3/2014 | Brooks | B25J 9/1676 |
| | | | | 700/255 |
| 2014/0163735 | A1 | 6/2014 | Yasuda et al. | |

* cited by examiner

METHOD AND DEVICE FOR CONTROLLING A ROBOT DURING CO-ACTIVITY

RELATED APPLICATIONS

This application is a § 371 application from PCT/EP2016/079055 filed Nov. 28, 2016, which claims priority from French Patent Application No. 15 02473 filed Nov. 26, 2015, each of which is herein incorporated by reference in its entirety.

FIELD OF THE INVENTION

The invention concerns a method and a device for controlling a robot in coactivity. The invention concerns the field of robots operating in an environment in coactivity with human operators or other robots, or cabots. The invention is in particular, but not exclusively, dedicated to the field of handling and assembly in the automotive, aeronautical and naval industries.

BACKGROUND OF THE INVENTION

According to the prior art, a robot able to work in coactivity, in particular with human operators, comprises several safety devices used alone or combined. For example, such a robot comprises force sensors on its various axes and means for triggering a safety stop of the robot when the force measured on one of these sensors exceeds a threshold value, for example 150 N. Once in a safety stop, the robot must be reset in order to resume its normal operation.

According to another operating procedure used in addition to the previous one, the robot evolves in conformity with a so-called safety speed. This safety speed is sufficiently reduced to allow at the same time a possible operator to easily anticipate the movements of the robot and thus avoid the collision, and, on the other hand, not to hurt the operator if ever such a collision happened despite everything.

These speed and force limits are especially defined in the ISO 10218 and ISO TS 15066 standards.

These solutions of the prior art have the disadvantage of greatly reducing the productivity of the robot. In addition, acceptable stress limits are statically defined. Thus, the force limit defined for detecting a collision with a static operator is not necessarily relevant if the collision occurs with a moving person, such a collision being also likely to have other consequences, for example a fall, which generate indirect traumas. In other circumstances, a low contact force, less than 150 N, but prolonged, for example at the level of the larynx or the ribcage is likely to cause significant trauma. Also, although these systems of the prior art greatly reduce the productivity of the robot, they do not provide a total security of operation.

OBJECT AND SUMMARY OF THE INVENTION

The invention aims to solve the disadvantages of the prior art and for this purpose concerns a method for controlling the operation of a robot within a system comprising said robot and means for analyzing its environment, particularly concentric, comprising:
  i. a contact sensor;
  ii. a proximity sensor;
  iii. a vision and location sensor;

which method comprises the steps of:
  a. Obtaining for each axis of the robot a maximum admissible force value;
  b. if the force on one of the axes of the robot is greater than the maximum value acquired at step a, stop the robot in its position;
  c. obtaining a surveillance space, named a security space, the extent of which depends on the speed of the robot;
  d. monitor the environment of the robot by means of analysis;
  e. if the intrusion of an object is detected in the security space of the robot, gradually reduce the speed to a so-called security speed;
  f. resume from step a.

As between steps i) and f), the method comprises the following step: I) if the proximity of the intrusive object is detected by the proximity sensor or if contact with the said intrusive object is detected by the contact sensor, place the robot in a state of gravity compensation.

Thus, the robot scans its environment continuously and operates in safety mode, at reduced speed, only if the presence of an obstacle constituting a risk of collision occurs in this environment. The monitored space being a function of the speed of the robot, the behavior of the robot vis-à-vis the risk of collision depends on its working conditions, in particular its speed of execution.

The implementation of step I) when carrying out the method according to the invention allows the operator to remove the robot himself by pushing it effortlessly.

The invention is advantageously implemented according to the operating procedures and variants discussed below, which are to be considered individually or in any technically operative combination.

According to an advantageous operating procedure, the method, subject of the invention comprises between the steps e) and f) the steps consisting of:
  g. obtaining the position of the intrusive object in the environment of the robot;
  h. calculating and avoidance trajectory;
  i. continuing to move the robot according to the avoidance trajectory calculated in h).

Thus, according to this improved operating procedure, the robot continues to perform its tasks at the safety speed as long as it is possible to avoid the obstacle and thus avoid being in the situation of step b), which leads to a stop. This operating procedure is also safer to the operator by significantly reducing the risk of collision even if the operator is not paying attention.

According to an improved version of the operating procedure, the method making the object of the invention comprises between the steps i) and f) the steps consisting of:
  j. if the proximity of the intrusive object is detected by the proximity sensor, calculate an outbound trajectory of said object.

Thus, in case of a risk of collision, detected by the proximity sensor, the robot not only that slows down, but also tries to escape the obstacle, which increases the safety of the operator or the other robot located in the monitored environment.

Beneficially, according to this latter operating procedure, the method making the object of the invention comprises between the steps j) and f) the steps consisting of:
  k. if a contact with the intrusive object is detected by the contact sensor, generate an outbound trajectory away from the contact.

This operating procedure helps ensuring that contact, even under reduced effort, is not maintained with the object.

Beneficially, the orders of movement of the robot are generated by a controller delivering orders of temporal position in servo and: the reduction of the speed during step e) is obtained by modifying the interpolation time interval of the robot without modifying the servo frequency.

According to a particular operating procedure, the σ (t) temporal position orders of the robot are delivered by the controller as a function of a theoretical trajectory s(t) according to a control temporal interval Δt corresponding to a servo frequency 1/Δt so that under nominal operating conditions σ(t)=s(t); and the reduction of speed during step e) is achieved by introducing a virtual time so that σ(t+Δt)=s(t+k·Δt) where k≤1.

According to an operating procedure of the steps j) or k) of the method making the object of the invention, the robot moving towards a target position along a theoretical trajectory, the modified trajectory during these steps is obtained by bending said theoretical trajectory proportionally with a repulsion vector oriented according to the detection axis of the sensor and proportional in intensity with the information delivered by said sensor. This operation procedure makes it possible to bend the trajectory in real time so as to escape the collision or to limit its effects, while maintaining, as far as possible, the displacement towards the target point in the case of implementing step j).

According to an operating procedure of step h) of the method making the object of the invention, the robot moving towards a target position following a theoretical trajectory, the calculation of the avoidance trajectory from step h) comprises the generation of several random theoretical positions in the monitoring space of the robot, eliminating the random positions colliding with the intrusive object, and the definition of the shortest trajectory to reach the target position among the remaining positions. This operating procedure allows the rapid generation of an avoidance trajectory.

BRIEF DESCRIPTION OF THE DRAWINGS

The invention is expounded on below according to its preferred operating procedures, in no way limiting, and with reference to FIGS. 1 to 5, in which.

DETAILED DESCRIPTION OF THE EMBODIMENTS

Figure 1:
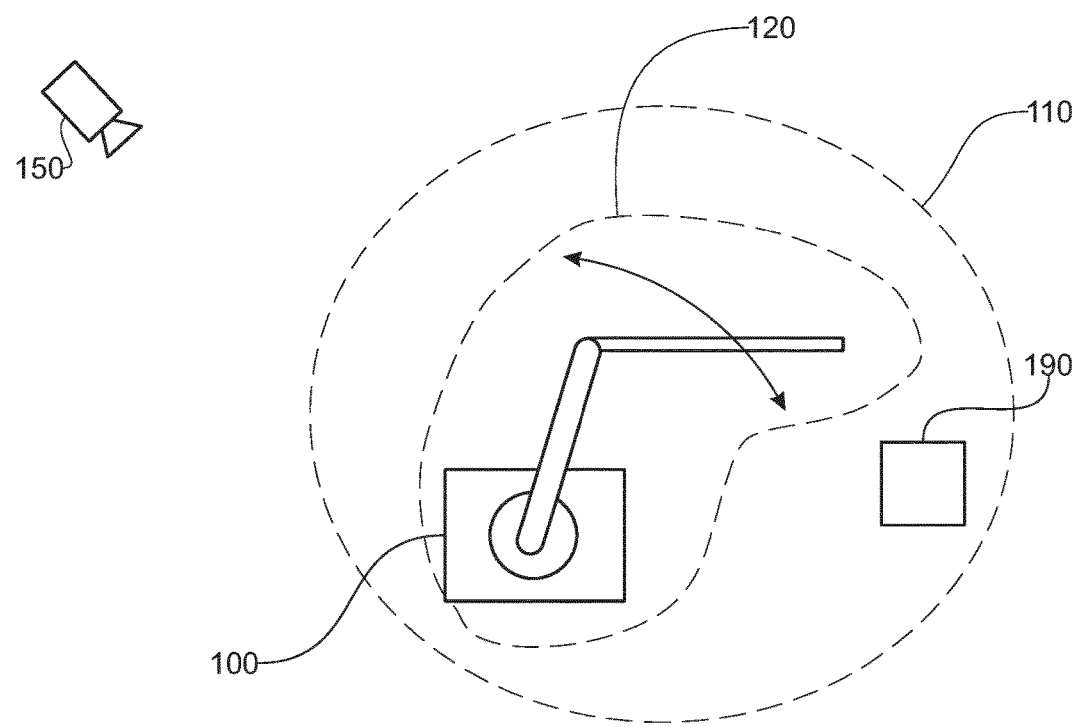
FIG. 1 shows schematically the robot and its monitoring space according to a view from above.

FIG. 1, according to an example of embodiment, the robot (100) making the subject of the invention comprises means (150) of monitoring its environment, for example in the form of a vision and location sensor (150) such as a camera 30 or a laser. This sensor, attached or independent of the robot (100) monitors an area (110), named concentric monitoring space, and locates in this space the robot (100) and any new object (190) or operator crossing the limit of this zone. The concentric monitoring space is represented here schematically and arbitrarily. In practice, it is a three-dimensional volume of shape adapted to the operation performed by the robot and integrating said robot regardless of its particular position. The extent of the monitoring zone in which the intrusion of an object (190) is considered as a risk of collision is a function of the robot's speed of movement. The higher this speed, the wider the monitoring zone. The robot (100) also comprises one or more proximity sensors (not shown), able to detect the presence of an object or an operator in a zone (120) tighten around the robot. The vision and positioning methods (150) continuously monitor the environment (110) of the robot, while the proximity sensors deliver information only if the proximity of an object is detected. As a non-limiting example, the proximity sensor is a light barrier or even an ultrasonic sensor. The zone (120) of detection of the proximity sensors of the robots (100) is in actuality a volume of any shape, depending on the technology or the combination of detection technologies. The robot (100) also comprises one or more contact sensors (not shown) which deliver information when an object or an operator comes into contact with the robot. As a nonlimiting example, such a contact sensor is made by measuring the control currents of the axis motors or by a force sensor. Thus, the system implemented by the method making the subject of the invention comprises several levels of detection of an intrusion, and the steps aiming to protect the robot and the object of intrusion are implemented gradually, function of the crossing of domains monitored by these different means of analysis. Each detection level is monitored by one or a plurality of sensors. According to the method making the subject of the invention, when an object (190) or an operator crosses the limit (110) of the monitoring space, the speed of movement of the robot is reduced to a safety speed. Reducing the speed of movement of the robot when an object crosses the boundary of the monitoring space is achieved by changing the interpolation time interval of the robot without changing the servo frequency.

Figure 2:
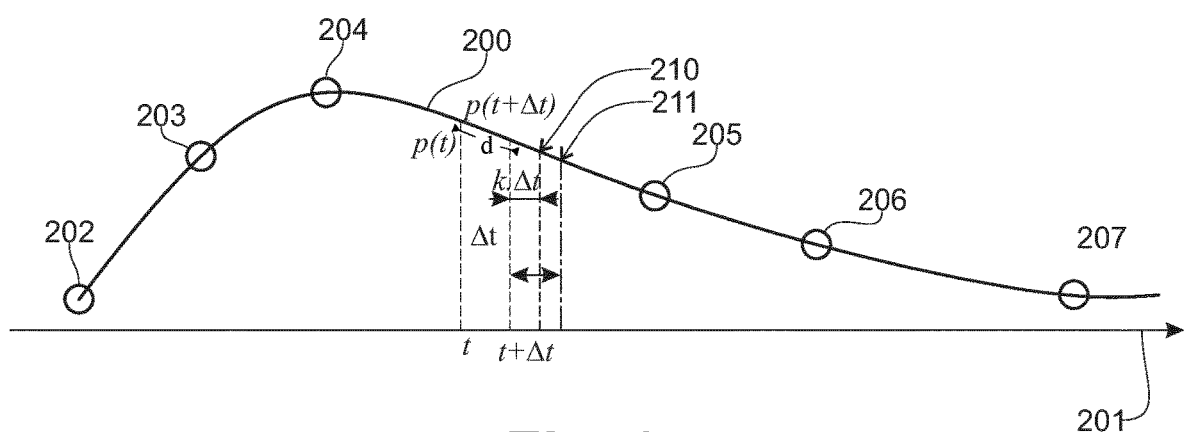
FIG. 2 illustrates the control principle in virtual time.

FIG. 2, the theoretical trajectory (200) s(t) of the robot is defined by a plurality of points (202, 203, 204, 205, 206, 207). To calculate the real trajectory, σ(t), of the robot as a function of these points of passage, an interpolation is performed between these points, for example by means of a spline function. From this interpolation, the processor defines the intermediary positions according to a time interval Δt corresponding to the servo frequency of the robot. As an example, Δt=0.02 seconds and the servo frequency is 50 Hz. Thus, at time t, the robot is in the position p(t) and at the time (t+Δt), the robot is in the position p(t+Δt) different from the d of the previous position. The instant speed of the robot between the two points of interpolation is d/Δt. The position of the point p(t+Δt) as a function of the position p(t) is given by the desired speed of the robot as a function of the servo frequency. It is calculated based on the interpolation function of the trajectory so that the actual trajectory in position, speed and acceleration of the robot, corresponds to the programmed theoretical trajectory. Thus, the robot movement controller addresses the axes of the said robot movement commands corresponding to each interpolation position according to a fixed servo frequency.

When an intrusion into the monitoring space is detected, the interpolation of the robot movement is performed according to an interpolation interval k·Δt, but the servo frequency remains the same, equal to 1/Δt. Thus, starting from the position p(t+Δt), the next interpolation point should be at a position (211) as interpolated for a time Δt. The k factor being less than 1, the calculated interpolation position (210) is delayed in relation to this theoretical position (211). Also, the robot slows down without the programming being modified. To accomplish this function, the robot controller comprises a second clock, controllable, for the definition of interpolation time used for the calculation of the trajectory. This mode of speed control is commonly referred to as a virtual time control and can be compared, from a didactic point of view, to the slow-motion effect obtained by filming a scene at a higher frame rate than the projection frequency of the film.

Figure 3:
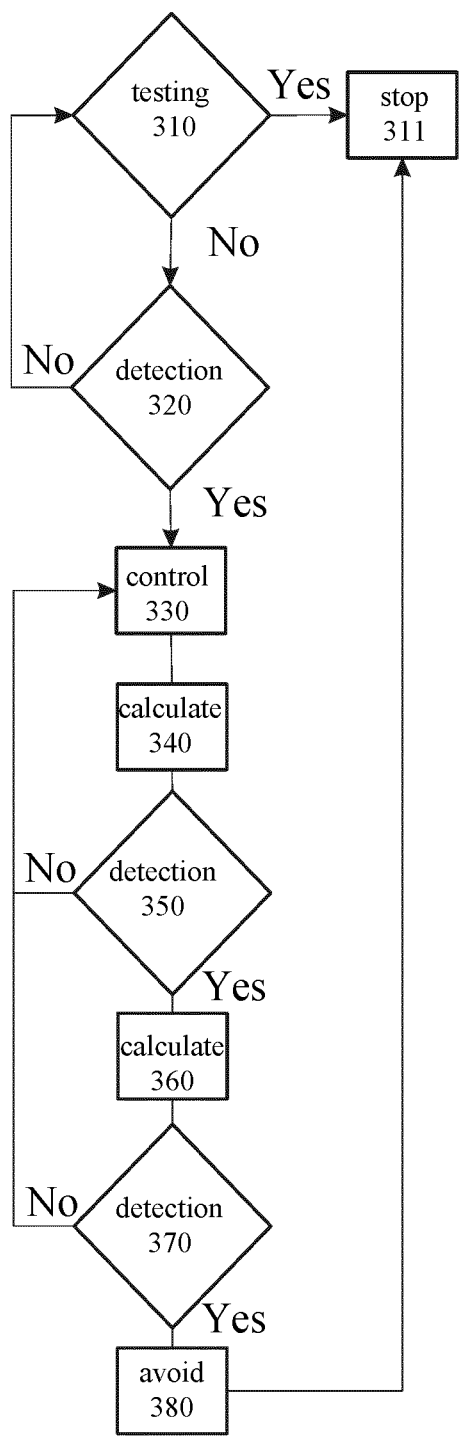
FIG. 3 represents the flowchart of an example of an operating procedure of the method making the object of the invention.

FIG. 3, according to an ultimate level of security, the robot steering system continuously examines the state of the contact sensors. During a testing step (310), if a contact with the robot is detected, for example, by detecting a control current exceeding a determined threshold on one of the robot axis motors, the emergency stop (311) of the robot is triggered. This emergency stop halts the robot, which must be reset to restart. Separate of this emergency, the robot works at its working speed, with the highest possible productivity. The environment of the robot is constantly examined by the vision and location methods. If, during a detection step (320), an intrusion is detected as crossing the boundary of the monitoring space, then, during a control step (330), the speed of the robot is reduced to a so-called security speed, predetermined, for example in accordance with the ISO 10218 and ISO TS 15066 standards for coactivity. This security speed is maintained as long as the introduced object is in the monitoring space. The speed reduction is carried out by means of the control in virtual time, so that the movement program continues, but at a reduced speed, allowing, for example, the operator who is in coactivity in the environment of the robot, to better anticipate the robot's movements and reduce the intensity of a possible shock. The monitoring of the continuous contact sensors and the ultimate safety mode resulting in the emergency stop of the robot remains active. According to one operating procedure, the vision and positioning sensors that scan the monitoring space are able to determine the position of the intrusive object in the environment of the robot. This position is transmitted to the steering system of the robot which calculates (340), based on this information, an avoidance trajectory of the intrusive object.

Figure 4:
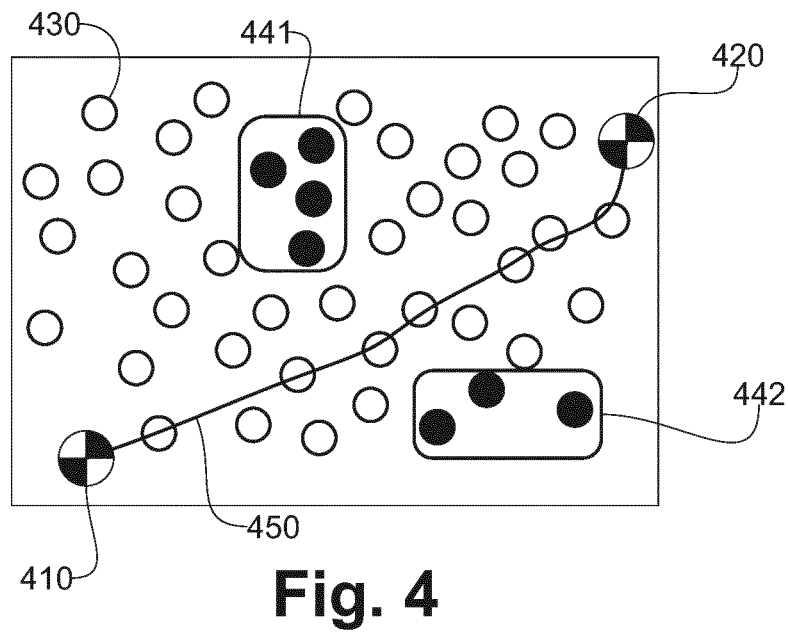
FIG. 4 illustrates the principle of calculating an avoidance trajectory.

FIG. 4, the robot being at a point (410) of the space and moving towards a target point (420), in order to calculate the avoidance trajectory, the processor generates a series of random points (430) in the monitoring space. The sets of points (441, 442) that collide with objects in the robot's environment, including the intrusive object, are eliminated. The processor then determines a trajectory (450), the shortest, passing through the remaining points and connecting the starting point (410) and the target point (420). Thus, the avoidance trajectory is calculated quickly.

Returning to FIG. 3, if during a detection step (350), a signal coming from a proximity sensor is detected, then the trajectory of the robot is modified, during a escape calculation step (360), so as to keep the robot away from this proximity.

Figure 5:
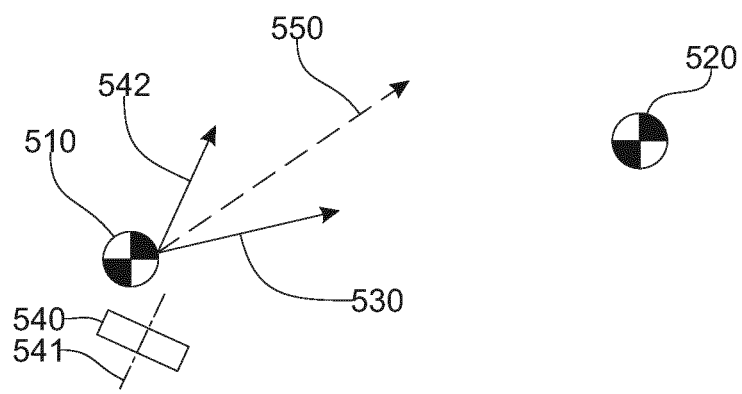
FIG. 5 outlines the principle of calculating an escape trajectory.

FIG. 5, the robot is in an initial position (510) and is moving towards a target position (520). In the absence of detection by the proximity sensors, this movement is made in a direction (530) oriented from the initial position to the target position and the trajectory of the robot follows this direction. In the presence of detection by a proximity sensor (540), said sensor detects the presence of the object along a defined axis (541). This detection thus defines a vector (542), named of repulsion, oriented in the direction (541) of detection of the sensor, and of an intensity so much stronger as the detected object is closer. This vector (542) is combined with the vector (530), called of attraction, defining the initial trajectory of the robot, the robot whose trajectory (550) is inflected accordingly, moving it away from the intrusive object while continuing its trajectory toward the target (520).

Returning to FIG. 3, the robot operating at the reduced safety speed, if during a contact detection step (370) a contact with an intrusive object is detected, the trajectory of the robot is modified during a step (380) of avoidance, so as to move the robot away from this contact. The avoidance trajectory is calculated similarly to the escape trajectory but considering only the repulsion vector: the robot moves away from the contact following this repulsion vector. According to one operating procedure, the robot is then stopped. According to another operating procedure, the robot is placed in a gravity compensation situation, which makes it possible to easily move the robot.

The above description and the examples of embodiments show that the invention accomplishes the intended purpose and enables the robot that may be in co-activity with an operator to work to the maximum of its productivity, while improving the security of said operator. The method making the subject of the invention is effective vis-a-vis the work movements of the robot but also in the context of its movement between two workstations.

The invention claimed is:

1. A method for controlling an operation of a robot within a system comprising the robot and sensors to analyze a concentric environment of the robot, the sensors comprise a contact sensor, a proximity sensor and a vision and location sensor, the method comprises steps of:
 a) obtaining for each axis of the robot, a maximum allowable force value;
 b) stopping the robot in its position in response to a determination that a force on one of the axes of the robot is greater than the maximum allowable force value;
 c) obtaining a security space as a function of a speed of the robot;
 d) monitoring the concentric environment of the robot by the sensors;
 e) gradually reducing the speed of the robot to a safety speed in response to a detection of an intrusion of an intrusive object in the security space of the robot; and
 f) repeating steps a)-e); and
 wherein temporal position commands $\sigma(t)$ of the robot are delivered by a robot controller as a function of a theoretical trajectory $s(t)$ according to a temporal control interval $\Delta t$ corresponding to a servo frequency $1/\Delta t$, so that under nominal conditions of operation $\sigma(t)=s(t)$; and wherein the speed reduction during step e) is achieved by introducing a virtual time so that $\sigma(t+\Delta t) = s(t+k\cdot\Delta t)$ where $k \leq 1$.

2. The method according to claim 1, further comprising, between steps e) and f), steps of:
 g) obtaining a position of the intrusive object in the security space of the robot;
 h) computing an avoidance path by a processor and a robot controller; and
 i) moving the robot along the avoidance path.

3. The method according to claim 2, further comprising, between steps i) and f), step j) of determining a modified path away from the intrusive object in response to a detection of a proximity of the intrusive object by the proximity sensor.

4. The method according to claim 3, comprising, between steps j) and f), step k) of generating the modified path away from the intrusive object in response to a detection of a contact with the intrusive object by the contact sensor.

5. The method according to claim 1, further comprising, between steps e) and f), step 1) of placing the robot in a state of gravity compensation in response to a detection of a proximity of the intrusive object by the proximity sensor or to a detection of a contact with the intrusive object by the contact sensor.

6. The method as claimed in claim 1, wherein robot motion commands are generated by the robot controller to deliver temporal position commands σ(t); and further comprising modifying an interpolation time interval of the robot without modifying a servo frequency to gradually reduce the speed of the robot.

7. The method according to claim 3, wherein the robot is configured to move to a target position following a theoretical path; and wherein the modified path is obtained by bending the theoretical path in proportion to a vector of repulsion, oriented along a detection axis of the proximity sensor and of an intensity proportional to information delivered by the proximity sensor.

8. The method according to claim 4, wherein the robot is configured to move to a target position following a theoretical path; and wherein the modified path is obtained by bending the theoretical path in proportion to a vector of repulsion, oriented along a detection axis of the contact sensor and of an intensity proportional to information delivered by the contact sensor.

9. The method according to claim 2, wherein the robot is configured to move toward a target position along a theoretical path; and wherein the step of computing the avoidance path comprises steps of: generating a plurality of theoretical random positions in the security space of the robot; eliminating the random positions colliding with the intrusive object, and determining a shortest path to reach the target position among the remaining random positions.

* * * * *